United States Patent [19]
Chaskin

[11] 3,957,394
[45] May 18, 1976

[54] MARINE PROPELLER MOUNTING DEVICE
[76] Inventor: Harold Chaskin, 131 Bennett Ave., New York, N.Y. 10033
[22] Filed: Mar. 17, 1975
[21] Appl. No.: 558,793

[52] U.S. Cl. .............................. 416/244 B; 151/28; 403/259
[51] Int. Cl.² ......................................... B63H 1/20
[58] Field of Search ............ 416/244, 244 A, 244 B; 403/259, 316, 320; 151/17, 27, 29, 2 R

[56] References Cited
UNITED STATES PATENTS

| | | | |
|---|---|---|---|
| 1,290,450 | 1/1919 | Wiley | 151/28 |
| 1,317,058 | 9/1919 | Wiley | 151/28 |
| 2,317,070 | 4/1943 | Le Tourneau | 403/259 X |
| 2,336,164 | 12/1943 | Chaskin | 151/17 |
| 3,104,459 | 9/1963 | Wendt | 416/244 B X |
| 3,792,938 | 2/1974 | Wilde | 416/245 |

FOREIGN PATENTS OR APPLICATIONS

| 874,674 | 8/1942 | France | 416/244 |
|---|---|---|---|

Primary Examiner—Everette A. Powell, Jr.
Attorney, Agent, or Firm—Daniel Jay Tick

[57] ABSTRACT

A shaft coupled at one end to motive means is externally threaded in spaced proximate relation with the opposite free end thereof. A plurality of keyways supporting a plurality of keys are provided at the free end of the shaft. A propeller mount supporting a marine propeller for rotation therewith is coaxially positioned over the shaft and has an internally threaded axial bore threadedly coupled to the threading of the shaft. A component is coaxially positioned over part of the propeller mount. An annular restraining member is coaxially positioned over the shaft and within an axial bore of the component. A plurality of bores are formed through the restraining member in alignment with bores of the propeller mount. The restraining member is coupled to the propeller mount via a plurality of screws in the bores thereof with a predetermined gap between the restraining member and the propeller mount thereby preventing axial movement of the propeller mount. An assembly nut member has a plurality of adjoining axial bores of different diameters formed therethrough. The nut member is threadedly coupled to the component via an externally threaded part of the component. A plurality of set screws in radially extending bores of the assembly nut member are threadedly coupled in radially extending bores of the component.

7 Claims, 13 Drawing Figures

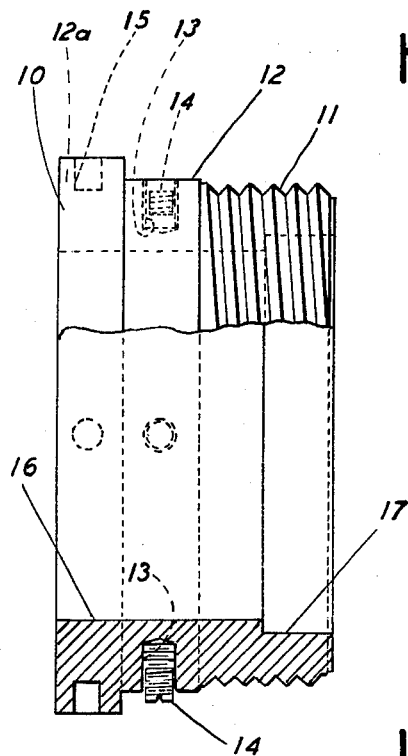
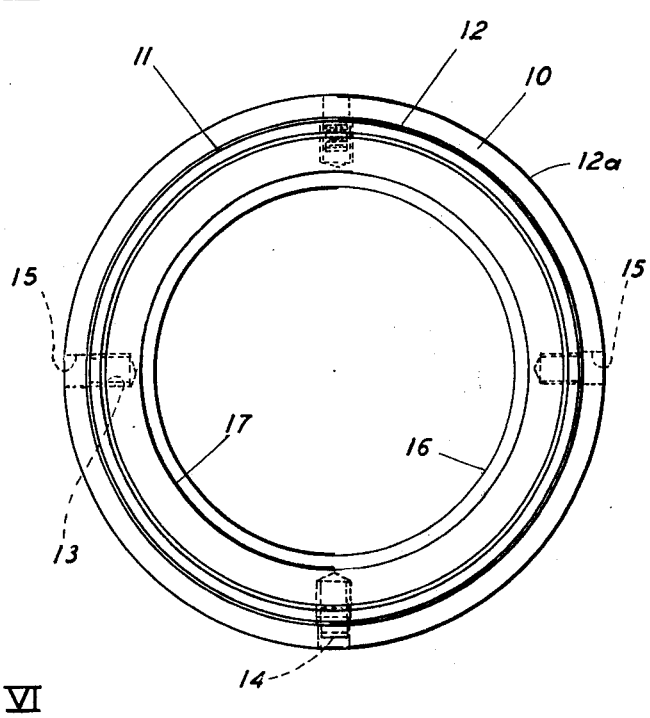
FIG. 5  FIG. 6
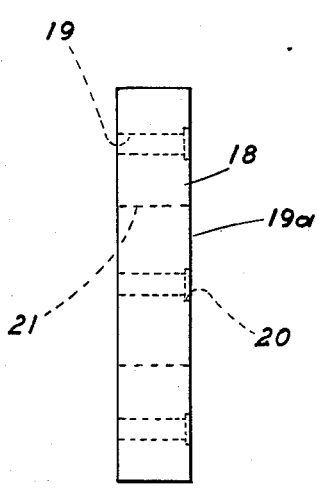
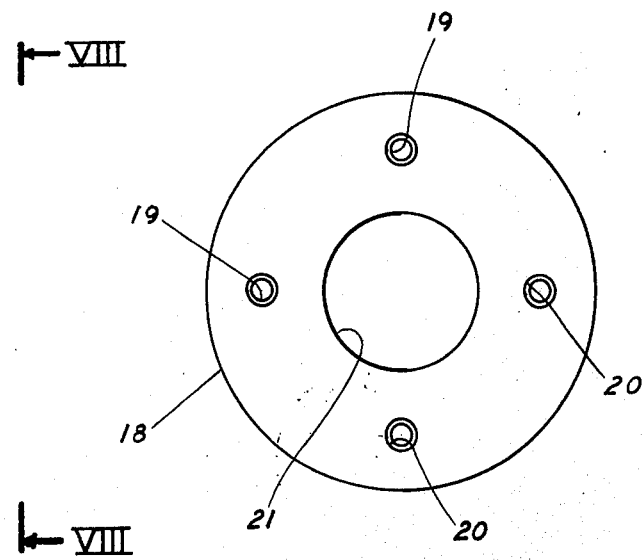
FIG. 7  FIG. 8

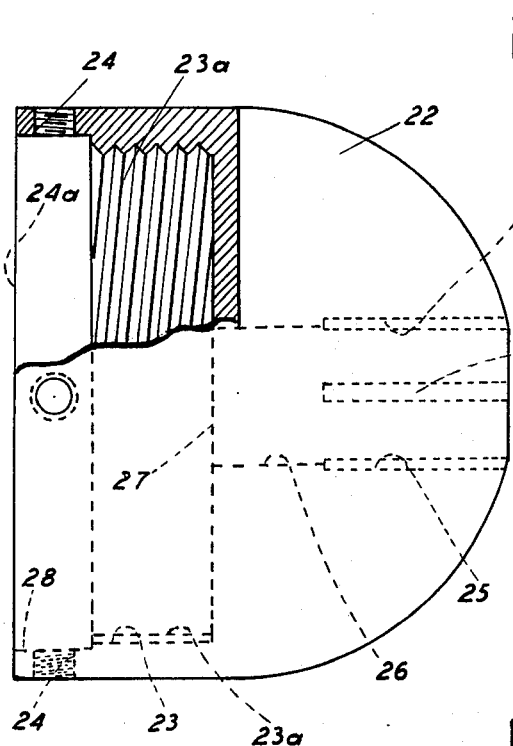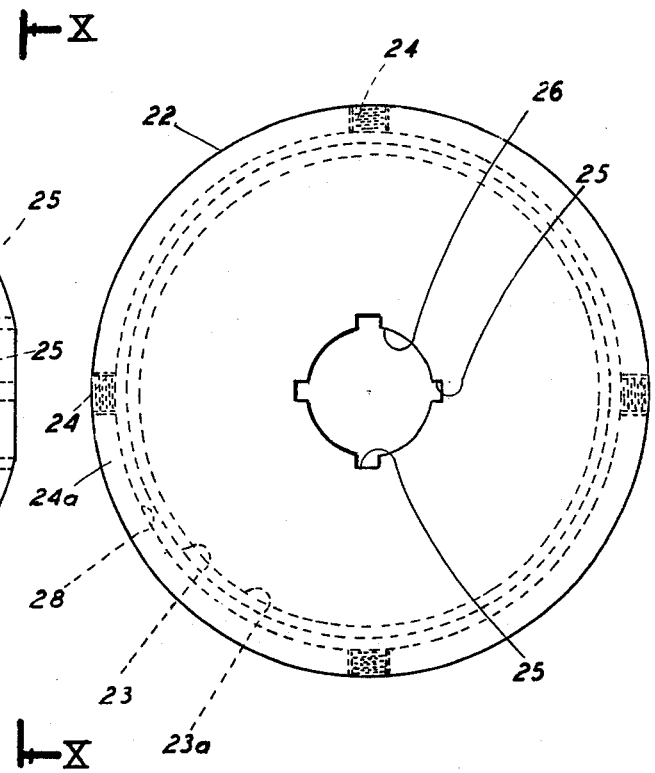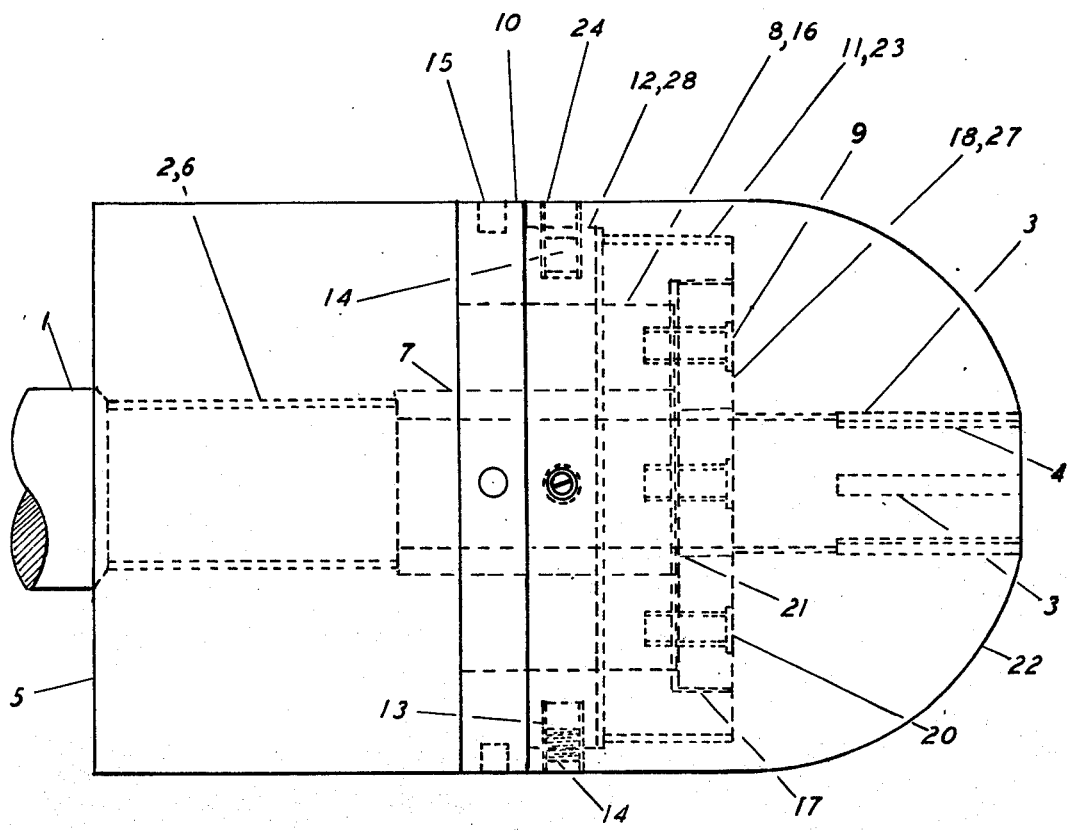

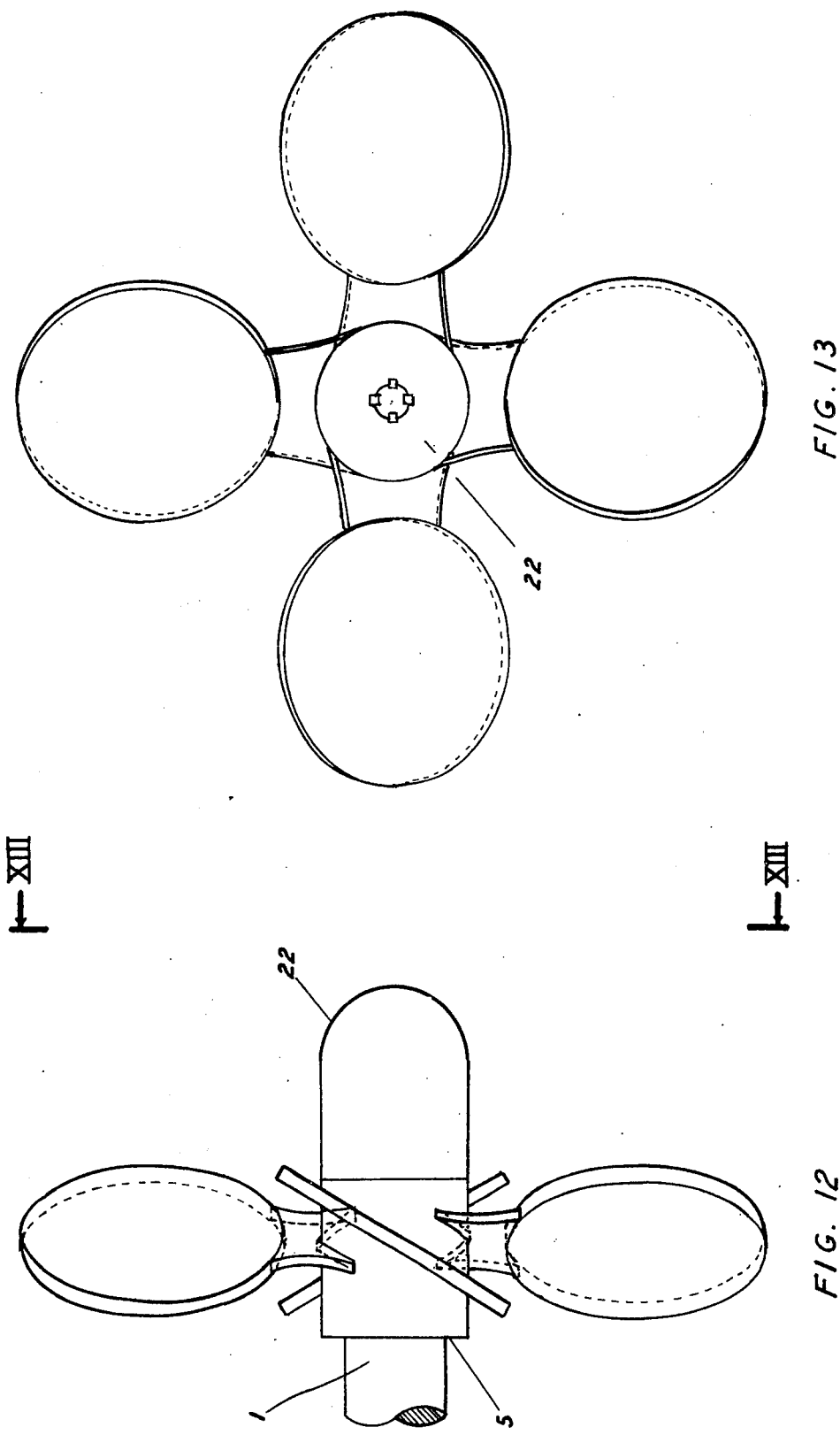

MARINE PROPELLER MOUNTING DEVICE

CROSS-REFERENCE TO RELATED APPLICATION

The present invention is an improvement over an earlier invention of a Lock Nut, described in U.S. Pat. No. 2,336,164, issued Dec. 7, 1943 to Harold Chaskin, the present applicant.

BACKGROUND OF THE INVENTION

The present invention relates to a marine propeller mounting device.

Marine propeller mounting devices are subject to considerable stresses and strains due to abrupt transitions of the propeller drive shaft from rest to high rotary velocities, high rotary velocities to rest, from one speed to another, and from one direction of rotation to the opposite direction of rotation in normal operation. These stresses and strains lead to breakdowns and serious failure of equipment, entailing very great maintenance and repair costs.

The principal object of the invention is to provide a marine propeller mounting device with considerably reduced stresses and strains on the component parts thereof.

An object of the invention is to provide a marine propeller mounting device which prevents loss of the propeller from the drive shaft.

Another object of the invention is to provide a marine propeller mounting device requiring considerably less maintenance and repair than known marine propeller mounting devices.

Still another object of the invention is to provide a marine propeller mounting device of sturdy, reliable structure, which functions efficiently, effectively and reliably for a long time.

BRIEF SUMMARY OF THE INVENTION

In accordance with the invention, a marine propeller mounting device for a marine propeller driven by motive means comprises a shaft coupled at one end to motive means and having an opposite free end. The shaft has external threading thereon in spaced proximate relation with the free end thereof. A plurality of keyways are formed in the shaft at the free end thereof extending parallel to the axis of the shaft in spaced equiangular relation. A plurality of keys supported in said keyways. A propeller mount supports a marine propeller for rotation therewith. The propeller mount is coaxially positioned over the shaft and has an internally threaded axial bore threadedly coupled to the threading of the shaft and a plurality of internally threaded bores formed in an end surface thereof parallel to the axis. A component coaxially positioned over part of the propeller mount has a first part with external threading thereon and a second part having a plurality of radially extending internally threaded bores formed therein in spaced equiangular relation. First and second adjoining axial bores are formed through the component. The second bore has a larger diameter than the first. The first bore accommodates part of the propeller mount. A substantially annular restraining member is coaxially positioned over the shaft and within the second bore of the component. The restraining member has a plurality of bores formed therethrough in alignment with the bores of the propeller mount. Each of a plurality of screws is provided in a corresponding one of the bores of the restraining member and each is threadedly coupled to the propeller mount via a corresponding one of the bores of the propeller mount coupling the restraining member to the propeller mount with a predetermined gap between the restraining member and the propeller mount thereby preventing axial movement of the propeller mount. An assembly nut member has first, second and third adjoining axial bores formed therethrough. The first bore has a larger diameter than the second and the second bore has a larger diameter than the third. A plurality of radially extending internally threaded bores are formed in the nut member around the first bore in alignment with the radially extending bores of the component. The second bore is internally threaded. A plurality of keyways are formed in the third bore in alignment with the keys of the shaft. The nut member is threadedly coupled to the component via the externally threaded part of the component and the second bore of the nut member. Each of a plurality of set screws is threadedly coupled in a corresponding one of the radially extending bores of the assembly nut member and threadedly coupled in a corresponding one of the radially extending bores of the component.

The propeller mount comprises a substantially cylindrical member having first and second axial bores formed therethrough. The second bore has a larger diameter than the first. The first bore is internally threaded. The bores formed in the end surface extend parallel to the axis of the propeller mount in spaced equiangular relation.

The component comprises a substantially cylindrical member, having an end part with a substantially cylindrical surface next-adjacent the second part. The second part is nextadjacent the first part and has a cylindrical surface. The first bore extends through the first and second parts and part of the third part. The second bore extends through part of the third part.

The component has a plurality of radially extending pin bores formed in the end part thereof in spaced equiangular relation in the same angular positions as the internally threaded bores thereof.

The restraining member has an axial bore therethrough for accommodating the shaft. The plurality of bores of the restraining member extend parallel to the axis of the restraining member in spaced equiangular relation.

Each of the plurality of bores of the restraining member has a countersunk bore at a surface from which it extends.

The assembly nut member comprises a substantially cylindrical member rounded at one end. The internally threaded bores are in spaced equiangular relation. The keyways extend parallel to the axis of the nut member and are in spaced equiangular relation.

BRIEF DESCRIPTION OF THE DRAWINGS

In order that the invention may be readily carried into effect, it will now be described with reference to the accompanying drawing, wherein:

FIG. 5 is a view, partly cut away and partly in section, of an embodiment of the component of the marine propeller mounting device of the invention;

FIG. 6 is an axial view, taken along the lines VI—VI, of FIG. 5;

FIG. 7 is a view of an embodiment of the restraining member of the marine propeller mounting device of the invention;

FIG. 8 is an axial view, taken along the lines VIII—VIII, of FIG. 7;

FIG. 9 is a view, partly cut away and partly in section, of an embodiment of the assembly nut member of the marine propeller mounting device of the invention;

FIG. 10 is an axial view, taken along the lines X—X, of FIG. 9;

FIG. 11 is a view of the assembled marine propeller mounting device of the invention;

FIG. 12 is a view of the assembled marine propeller mounting device of the invention mounting a propeller; and FIG. 13 is an axial view of the assembled marine propeller mounting device of the invention, taken along the lines XIII—XIII, of FIG. 12.

In the FIGS., the same components are identified by the same reference numerals.

DETAILED DESCRIPTION OF THE INVENTION

Figure 1:
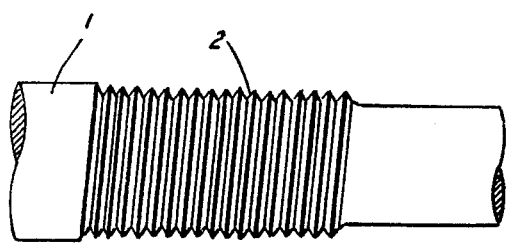
FIG. 1 is a view of an embodiment of the shaft of the marine propeller mounting device of the invention.
Figure 2:
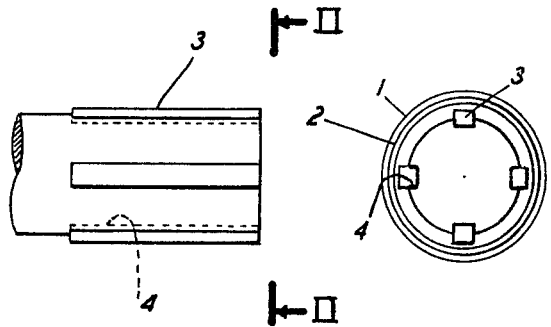
FIG. 2 is an axial view, taken along the lines II—II, of FIG. 1.

The marine propeller mounting device of the invention comprises an engine shaft 1, the free end or propeller mounting end of which is externally threaded with left-hand threading 2 (FIGS. 1 and 2) in the area of the end of the shaft. The very end of the shaft 1 has a plurality of keys 3, force-fitted into keyways or slots 4 formed in the shaft and extending parallel to the axis of the shaft in spaced equiangular relation (FIGS. 1 and 2). There are preferably four keys 3.

Figure 3:
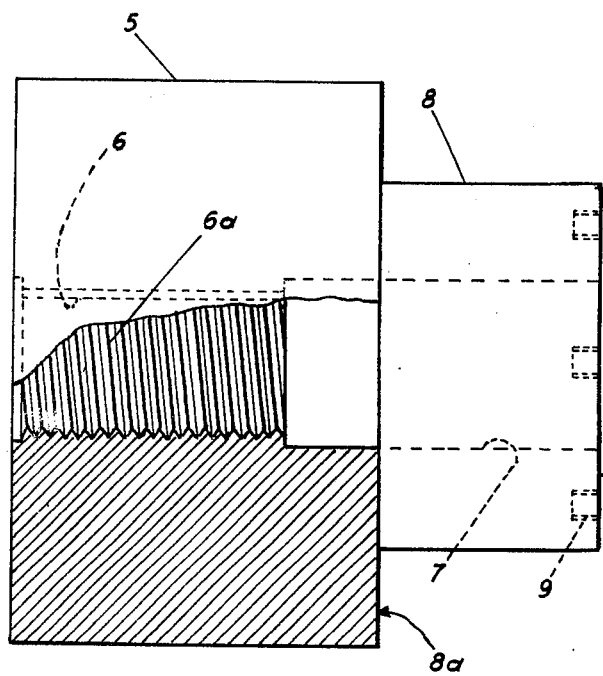
FIG. 3 is a view, partly cut away and partly in section, of an embodiment of the propeller mount of the marine propeller mounting device of the invention.
Figure 4:
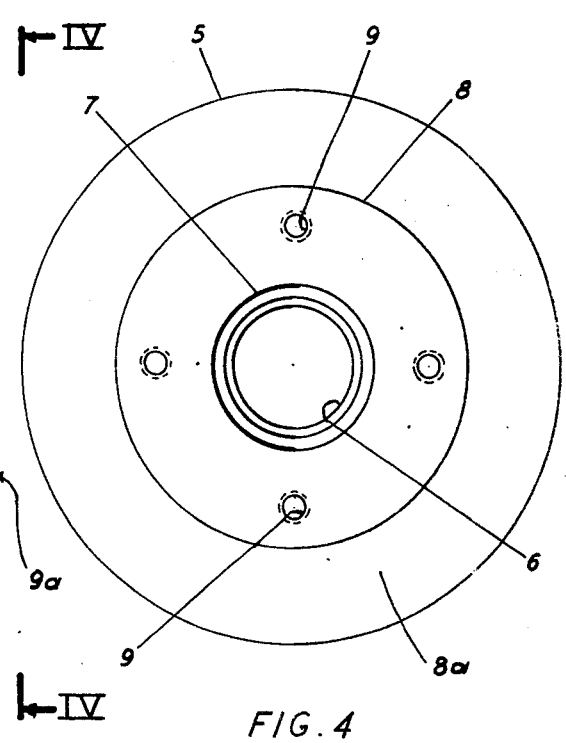
FIG. 4 is an axial view, taken along the lines IV—IV, of FIG. 3.

A propeller mount 5 of substantially cylindrical configuration has an axial bore 6 formed therethrough having internal left-hand threading 6a (FIG. 3) for coaction with the external threading 2 of the shaft 1. The bore 6 opens into another axial bore 7 of greater diameter than the bore 6 to permit sufficient clearance in assembly (FIGS. 3 and 4). The propeller mount 5 is of substantially cylindrical configuration and has a coaxial section 8 of substantially cylindrical configuration extending from a substantially planar surface 8a thereof (FIGS. 3 and 4). The section 8 is of smaller diameter than the propeller mount 5.

A plurality of tapped, internally threaded, bores 9 are formed in the substantially planar end surface 9a of the section 8 (FIGS. 3 and 4). The bores 9 extend parallel to the axis of the propeller mount 5 in spaced equiangular relation (FIGS. 3 and 4). There are preferably four bores 9.

A component 10 of substantially cylindrical configuration has external right-hand threading 11 on part of its cylindrical surface (FIG. 5). The component 10 has a part 12 with a substantially cylindrical surface next-adjacent the threaded part and an end part 12a with a substantially cylindrical surface next-adjacent the part 12 (FIGS. 5 and 6). The diameter of the part 12 is smaller than the diameter of the part 12a.

A plurality of tapped, internally threaded bores, 13, are formed in the cylindrical surface of the part 12 of the component 10 (FIGS. 5 and 6). The bores 13 extend radially to the axis of the component 10 (FIGS. 5 and 6) in spaced equiangular relation (FIGS. 5 and 6). There are preferably four bores 13. A plurality of set screws 14 are provided. Each of the set screws 14 is threadedly coupled in a corresponding one of the bores 13, as shown in FIGS. 5 and 6.

A plurality of pin bores 15 are formed in the cylindrical surface of the part 12a of the component 10 (FIGS. 5 and 6). The pin bores 15 extend radially to the axis of the component 10 in spaced equiangular relation in the same angular positions as the bores 13 (FIGS. 5 and 6). The pin bores 15 accommodate assembly pins (not shown in the FIGS.)

The component 10 has an axial bore 16 formed therethrough. The bore 16 opens into another axial bore 17 of greater diameter than the bore 16 (FIGS. 5 and 6).

A restraining member 18 of substantially annular configuration has a plurality of bores 19 formed in a substantially planar surface 19a thereof (FIGS. 7 and 8). The bores 19 extend parallel to the axis of the restraining member 18 in spaced equiangular relation (FIGS. 7 and 8). There are preferably four bores 19. Each of the bores 19 is provided with a countersunk bore 20 at the surface 19a (FIGS. 7 and 8).

The restraining member 18 has an axial bore 21 formed therethrough (FIGS. 7 and 8) for accommodating the shaft 1.

An assembly nut member 22 is of substantially cylindrical configuration and is rounded at one end, as shown in FIG. 9. The component 22 has an axial bore 23 formed therethrough having internal right-hand threading 23a (FIG. 9) for coaction with the external threading 11 of the component 10 shown in FIG. 5.

A plurality of tapped, internally threaded, bores 24 are formed in the cylindrical surface of the member 22 in proximity with the base end 24a thereof (FIGS. 9 and 10). The bores 24 extend radially to the axis of the member 22 (FIGS. 9 and 10) in spaced equiangular relation (FIGS. 9 and 10). There are preferably four bores 24.

A plurality of keyways or slots 25 are formed in the member 22 opening on, and extending from, an axial bore 26 (FIGS. 9 and 10). The keyways 25 extend parallel to the axis of the member 22 in spaced equiangular relation. There are four keyways 25, and said keyways accommodate the keys 3 of the shaft 1, shown in FIGS. 1 and 2. The bore 26 accommodates the shaft 1.

A substantially planar annular stop wall 27 is provided in the member 22 at the border of the bores 23 and 26, since the bore 26 has a smaller diameter than the bore 23 (FIGS. 9 and 10). An axial bore 28 of greater diameter than the bore 23 is formed through the assembly nut member 22 and opens into the bore 23 inside said component and opens in the base end 24a of said component. The bores 24 open into the bore 28 (FIGS. 9 and 10).

The marine propeller mounting device of the invention is assembled as shown in FIG. 11. The propeller mount 5 of FIG. 3 is passed over the shaft 1 of FIG. 1 until the threading 6a of the bore of said propeller mount coacts with the threading 2 of said shaft. The component 10 of FIG. 5 is then joined to the propeller mount 5, since the bore 16 of said component slides over the compatible coaxial section 8 of said propeller mount. The component 10 is then free to rotate about the coaxial section 8, and is restrained from movement in axial directions when the restraining member 18 of FIG. 7 is seated in the bore 17 of the component 10.

As shown in FIG. 11, the component 10 is not completely restrained by the restraining member 18, since there is a gap to the left of said restraining member. This permits relatively easy movement of the component 10 for final assembly.

Flat-headed screws 20a (not shown in the FIGS.) are fitted into the countersunk bores 20 of the restraining member 18 and are screwed into the bores 9 of the section 8 of the propeller mount 5. The component 10 is freely rotatable, but its movement in axial directions is restricted to the width of the aforedescribed gap, shown in FIG. 11.

Finally, the assembly nut member 22 of FIG. 9 is mounted on the shaft 1 and slid over the keys 3 of said shaft. The clearance between the keys 3 of the shaft 1 and the keyways 25 of the assembly nut member 22 is held to a minimum, merely sufficient to permit assembly of the marine propeller mounting device of the invention. As the assembly nut member 22 is advanced in axial direction along the shaft 1, it is stopped when the threading 23a of the bore 23 of said nut member meets the threading 11 of the component 10, and coupling engagement of such member and component does not likely occur at such meeting.

If firm pressure is applied to the nut member 22 in the reverse direction, however, and if a tool is applied by insertion into the keyways 25 of said nut member to prevent friction between the keys 3 of the shaft 1 and said keyways, said nut member is advanced after the threading 23a and the threading 11 have found their mating positions. Rotation of the component 10 by the insertion of a pin into a pin bore 15 thereof establishes the threading 23a and 11 in their final mating position. A screw driver is inserted into the bores 24 of the nut member 22, and rotates the set screws 14, threadedly coupled in the bores 13 of the component 10, into their locking positions. All the parts are then locked in position, and any force for reversing such position, due, for example, to engine vibration, is offset by the resistance of the keys 3 of the shaft 1 to such force, regardless of which pair of threadings is responsible.

When the bores 13 are drilled and tapped in the component 10 and when the bores 24 are drilled and tapped in the member 22, said component and member are set in a vise after the threads 11 and 23a of said component and member are joined in their ultimate locking position. The bores 13 and 24 are thus produced with the assurance that, regardless of the position of the component 10 relative to the member 22, ultimately, the mating of the threads 11 and 23a will always bring the bores 13 and 24 into alignment and provide the desired "no play" condition between said component and said member.

When there is "play" between the shaft 1 and the members and component of the marine propeller mounting device of the invention riding on it, said shaft, members and component are subjected to dynamic forces. Before its rotation has been transmitted to the propeller mount 5, the rotating shaft 1 has a starting momentum, which may be great if "full speed ahead" or "full speed astern" is ordered suddenly. The shock may be considerable, even if the interval is small. This creates effects which may accumulate and eventually prove critical. This is true only if a "stand-still", or a sudden reversal of direction is ordered. Then, there is play, or there is play at starting.

There is a scientific fact which is applicable to the status of the moving parts of the marine propeller mounting device of the invention. "Inertia" is the condition describing the tendency of "Nature" to prevent any change in its static or dynamic condition. Thus, it requires energy to give mobility to a standing marine vessel or vehicle, and, conversely, braking action to reduce its movement. This theory is applicable to the propeller mounting device, which has some play between the rotating parts, so that a command of full speed astern, given from a stand-still or other position, may accumulate deteriorating stresses in the unit. This is illustrated by the following example of a moving vessel.

The pilot notes an obstacle directly in his path, which calls for caution on his part. The vessel has built up a certain momentum, which must be brought under control if any possible emergency should exist. This "momentum" is expressible in definite physical terms as follows:

$$\text{Momentum} = \text{Mass} \times \text{Velocity}$$

wherein $$\text{Mass} = \frac{\text{Total Weight of Vessel}}{\text{Acceleration of Gravity}}$$

$$\text{Velocity} = \text{Speed in Feet Per Second}$$

Reduced to more specific terms, $$\text{Momentum} = \frac{\text{Pounds}}{\frac{\text{feet}}{\text{sec.}} \times \frac{1}{\text{sec.}}} \times \frac{\text{feet}}{\text{sec.}}$$

$$= \text{Pounds} \times \frac{\text{sec.} \times \text{sec.}}{\text{feet}} \times \frac{\text{feet}}{\text{sec.}}$$

Simplifying, $$\text{Momentum} = \text{Pounds} \times \text{Seconds}$$

Impulse, on the other hand, is the reaction of the pilot or operator on realization of the situation confronting him. If the obstacle is at a reasonable distance, the pilot will gradually reduce the speed of his vessel. If the situation is critical, his impulse will be instantaneous. The greater the emergency, the smaller will be the time period available for him to react.

Thus, $$\text{Impulse} = \text{Force exerted} \times \text{Time available}$$

$$\text{Impulse} = \text{Pounds} \times \text{Seconds}$$

The similarity of the two factors thus indicates that, whether his vessel is stopped completely by the pilot safely in the critical situation, or brought to a controllable speed in the previous situation, the two factors will be equated to read $$\text{Impulse} = \text{Change in momentum}$$

either partial or complete.

Carried a step further, this equation can be interpreted to read $$\text{Force} \times \text{Time} = \text{Pounds} \times \text{Seconds}$$

From this, the formula reduces to the following, if the critical condition exists $$\text{Force} = \frac{\text{Pounds} \times \text{Seconds}}{\text{Time}}$$

It can be seen that the total force to be exerted by the pilot, if he is to completely balance the momentum of his vessel, approaches emergency proportions, the smaller the time period available to him to react. If the time period to reduce his speed aproaches "zero", then his effort will be insufficient, and the momentum of the vessel must be absorbed by the impact of the collision. The force resulting would reach infinite proportions if $$\text{Force} = \frac{\text{Pounds} \times \text{Seconds}}{0} = \infty$$

If the parts of the propeller assembly are designed carefully, with play held to the minimum, and eliminated completely if specifically required, there will be no inertia effect to permit a build-up of undesirable stresses under conditions of sudden starts of the vessel's engine. This is obvious, since all parts will be in contact with one another so that whatever Inertia does exist, it will be that of the drive shaft itself when reacting to the command of the engine to rotate.

It should be noted that play between the parts can be reduced to zero by machining the tapped holes joining the component 10 and the member 22 simultaneously after they have been joined in their ultimate positions, in the machine shop. This will assure the correct positioning of the holes 13 and 24 when the final assembly is complete.

While the invention has been described by means of a specific example and in a specific embodiment, I do not wish to be limited thereto, for obvious modifications will occur to those skilled in the art without departing from the spirit and scope of the invention.

I claim:

1. A marine propeller mounting device for a marine propeller driven by motive means, said mounting device comprising
    a shaft coupled at one end to motive means and having an opposite free end, said shaft having external threading thereon in spaced proximate relation with the free end thereof, a plurality of keyways formed in the shaft at the free end thereof extending parallel to the axis of the shaft in spaced equiangular relation and a plurality of keys supported in said keyways;
    a propeller mount supporting a marine propeller for rotation therewith, said propeller mount being coaxially positioned over the shaft and having an internally threaded axial bore threadedly coupled to the threading of the shaft and a plurality of internally threaded bores formed in an end surface thereof parallel to the axis;
    a component coaxially positioned over part of the propeller mount, said component having a first part with external threading thereon, a second part having a plurality of radially extending internally threaded bores formed therein in spaced equiangular relation, and first and second adjoining axial bores formed through the component, the second bore having a larger diameter than the first, the first bore accommodating part of the propeller mount;
    a substantially annular restraining member coaxially positioned over the shaft and within the second bore of the component, said restraining member having a plurality of bores formed therethrough in alignment with the bores of the propeller mount;
    a plurality of screws each in a corresponding one of the bores of the restraining member and each threadedly coupled to the propeller mount via a corresponding one of the bores of the propeller mount coupling the restraining member to the propeller mount with a predetermined gap between the restraining member and the propeller mount thereby preventing axial movement of the propeller mount;
    an assembly nut member having first, second and third adjoining axial bores formed therethrough, the first bore having a larger diameter than the second and the second bore having a larger diameter than the third, a plurality of radially extending internally threaded bores formed in the nut member around the first bore in alignment with the radially extending bores of the component, the second bore being internally threaded and a plurality of keyways formed in the third bore in alignment with the keys of the shaft, said nut member being threadedly coupled to the component via the externally threaded part of said component and the second bore of said nut member; and
    a plurality of set screws each threadedly coupled in a corresponding one of the radially extending bores of the assembly nut member and threadedly coupled in a corresponding one of the radially extending bores of the component.

2. A marine propeller mounting device as claimed in claim 1, wherein the propeller mount comprises a substantially cylindrical member having first and second axial bores formed therethrough, the second bore having a larger diameter than the first, the first bore being internally threaded, the bores formed in the end surface extending parallel to the axis of the propeller mount in spaced equiangular relation.

3. A marine propeller mounting device as claimed in claim 2, wherein the component comprises a substantially cylindrical member, having an end part with a substantially cylindrical surface next-adjacent the second part, the second part being next-adjacent the first part and having a cylindrical surface, the first bore extending through the first and second parts and part of the third part and the second bore extending through part of the third part.

4. A marine propeller mounting device as claimed in claim 3, wherein the component has a plurality of radially extending pin bores formed in the end part thereof in spaced equiangular relation in the same angular positions as the internally threaded bores thereof.

5. A marine propeller mounting device as claimed in claim 3, wherein the restraining member has an axial bore therethrough for accommodating the shaft, the plurality of bores of said restraining member extending parallel to the axis of said restraining member in spaced equiangular relation.

6. A marine propeller mounting device as claimed in claim 5, wherein each of the plurality of bores of the restraining member has a countersunk bore at a surface from which it extends.

7. A marine propeller mounting device as claimed in claim 5, wherein the assembly nut member comprises a substantially cylindrical member rounded at one end, the internally threaded bores being in spaced equiangular relation, and the keyways extending parallel to the axis of the nut member and being in spaced equiangular relation.

* * * * *